INVENTOR.
FREDRICK R. BOSSARD

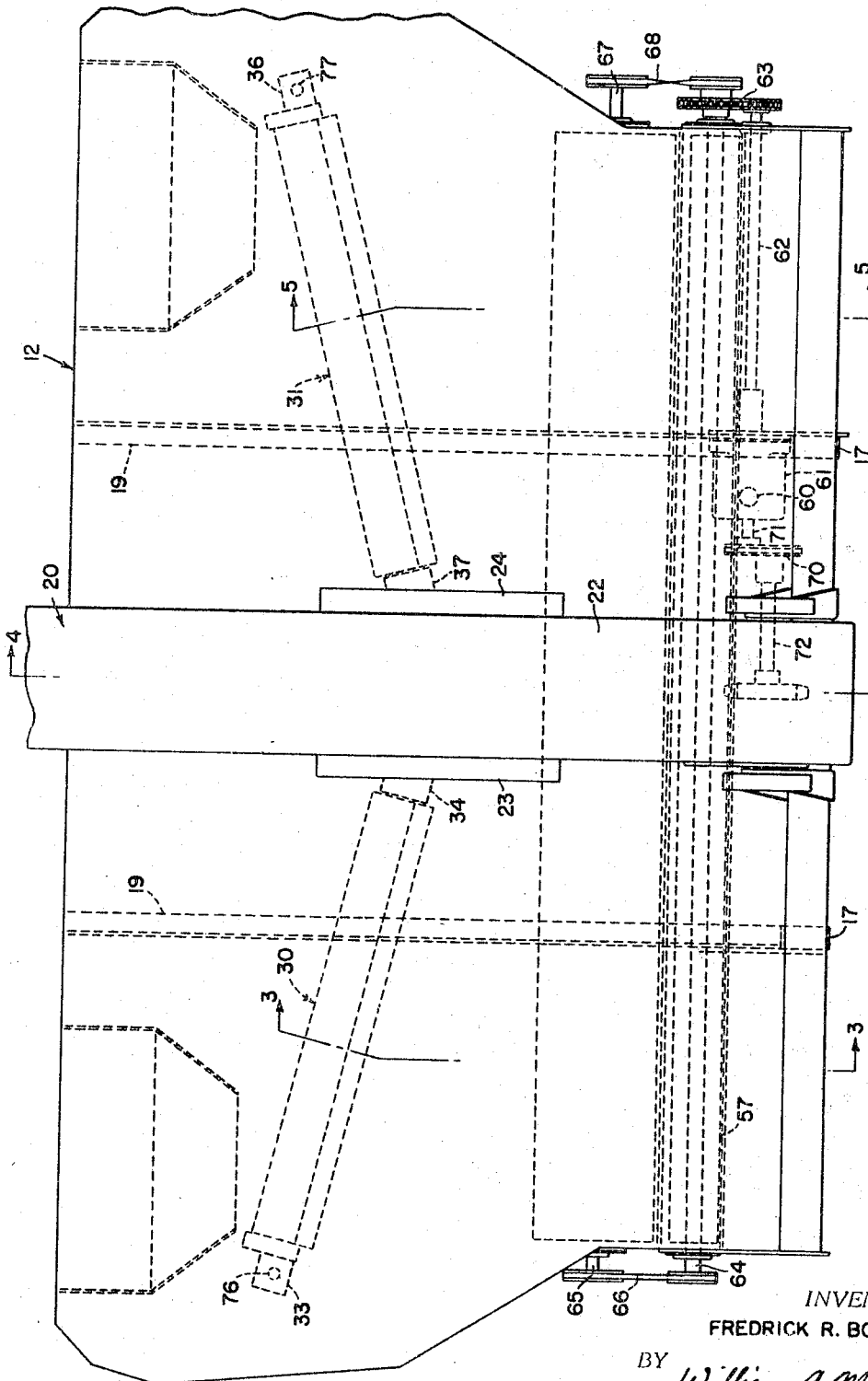

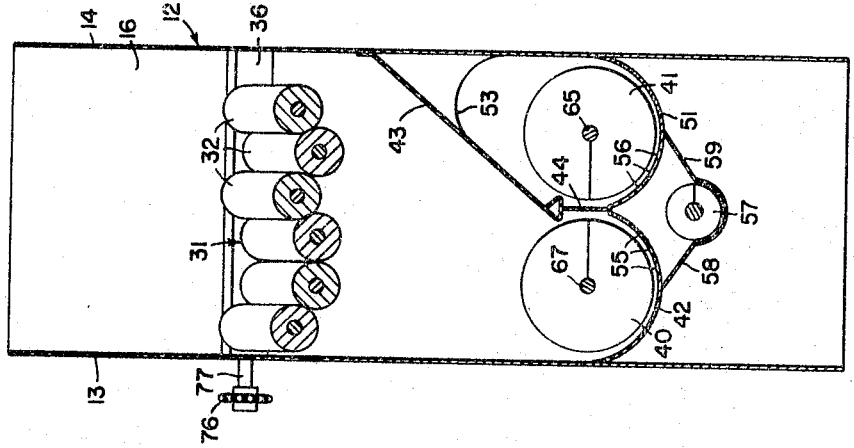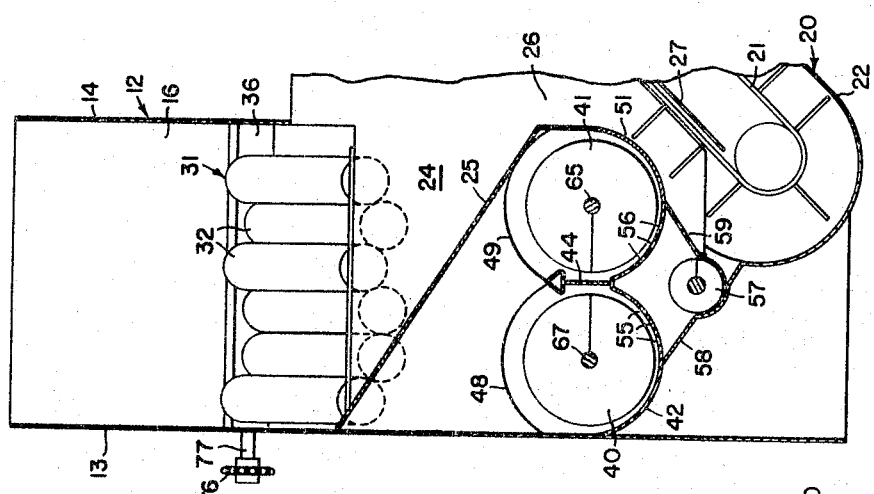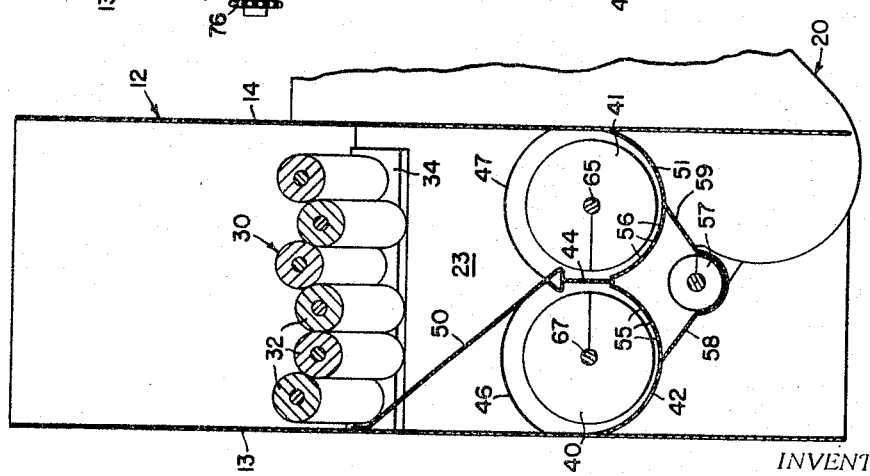

United States Patent Office 3,324,859
Patented June 13, 1967

3,324,859
CORN TREATING MECHANISM
Fredrick R. Bossard, Ankeny, Iowa, assignor to Deere & Company, Moline, Ill., a corporation of Delaware
Filed Apr. 9, 1965, Ser. No. 446,846
12 Claims. (Cl. 130—5)

This invention relates to a corn treating mechanism. Still more particularly this invention relates to a corn treating mechanism that is normally utlized with a pair of row crop units and is supported on the rear end of a tractor.

In harvesting and treating corn, it is desirable to collect the incidental kernels of corn that may be dislodged from the ears of corn. This is desirable for a first reason that loss of this corn can in some instances be considerable and consequently expensive, and for a second reason that kernels of corn if lost on the ground will in the following year create additional stalks of corn. This latter condtion creates a problem in many instances and the stalks must be manually removed from the field.

In the past, it was common to provide treating or husking units that may be attached to a tractor and receive corn from a pair of row units positioned on opposite sides of the tractor. Within the husking units have been provided husking beds that drive the trash or husks downwardly with incidental kernels of corn dislodged during the operation. The trash and kernels are collected in a pair of alined auger discharge conveyors that receives and moves it over perforated troughs that permit the kerenels to pass into a collecting means. The problem that exists is that often the kernels do not have sufficient time to pass through the trash and through the perforations before the material is discharged onto the ground.

With this in mind, it is the primary object of the present invention to provide a crop treating unit, which in the particular instance is in the form of a husking unit, that receives ears of corn from a pair of row units and passes trash and incidental kernels of corn shelled in the treating devices downwardly into transverse conveyors extending the full width of the treating unit. The transverse conveyors have perforated floors that permit the kernels to pass into an underlying transverse conveyor which in turn moves it to a centrally located discharge elevator of the husking or treating unit.

The treating units are disposed on opposite sides of the fore-and-aft center line of the vehicle carrying the husking unit with each having an outer end receiving the crops from one of the row units. The treating units are such as to move the corn from the outer to inner ends where the corn may gravitate to a discharge elevator. The housing unit for the treating units is compartmentized into outer end compartments beneath the husking beds and an inner central compartment between the inner ends of the husking beds.

Trash conveyors are positioned beneath the three compartments and are composed of front and rear transverse augers, the front auger being positioned to open upwardly into the right-hand outer compartment and to receive the trash therefrom. The rear transverse auger opens upwardly into the left-hand compartment and receives the trash from the husking bed on that side of the treating device. Both augers extend the full transverse width of the husking unit with the front auger moving trash from the right-hand side to the left end of the unit, and the rear auger moving trash from the left-hand side to the right end of the husking unit. Both augers are retained in auger troughs having their floors perforated to pass incidental kernels into a lower conveyor that receives and moves the kernels into the discharge elevator.

The advantage of this arrangement lies in the fact that the augers are positioned to move the trash and the incidental kernels the full transverse width of the husking or treating unit housing and consequently the incidental kernels of corn collected with the trash have the maximum length of time to pass adjacent a perforation and pass into the underlying conveyor.

This invention relates, therefore, to a corn treating mechanism adapted for support on the rear end of a mobile vehicle and comprising an upright transverse housing structure supported on that end and having transversely spaced left- and right-hand ends. Supported in the housing is a pair of transverse corn treating devices, which in the particular instance are husking beds, supported on the left- and right-hand sides of the housing structure and having outer ends adapted to receive ears of corn passing into the unit and to move the ears of corn to inner ends spaced apart and centrally located in the housing structure. Beneath the husking beds is a pair of first and second parallel transverse conveyors, one of which opens upwardly to receive trash from one of the husking beds and the other of which opens upwardly to receive trash from the other husking bed. Both conveyors extend full transverse width of the housing structure. Consequently the conveyor receiving the trash from the left-hand husking unit will move trash from the left to the right and beneath the right-hand husking bed. The conveyor receiving trash from the right-hand conveyor moves the trash from the right end to the left end of the housing unit and beneath the left-hand husking bed. Panels are positioned between the respective husking beds and the transverse conveyors so as to permit access of the correct conveyor with the trash passing through the husking bed and to block the trash from entering into the other conveyor. The auger troughs supporting the conveyors are perforated to permit incidental kernels of corn to pass through the trough floors and to be received in underlying conveyors that move the trash into a central discharge elevator. The elevator is adapted to receive the treated ears of corn as they pass downwardly from the inner ends of the husking beds. Generally the elevator has a material opening rearward of the housing for the treating unit and an underlying panel is positioned centrally beneath the inner ends of the husking units so as to guide the treated ears of corn rearwardly of the housing and into the opening for the elevator.

These and other objects of the present invention will become apparent to those skilled in the art as the nature of the invention is better understood from the following description and as shown in the accompanying drawings.

FIG. 2 is a rear view of the crop treating unit.

FIG. 3 is a sectional view, somewhat in schematic form taken substantially along the line 3—3 of FIG. 2.

FIG. 4 is a view similar to FIG. 3 but taken substantially along the line 4—4 of FIG. 2.

FIG. 5 is a sectional view similar to the views shown in FIGS. 3 and 4 but taken along the line 5—5 of FIG. 2.

Figure 1:
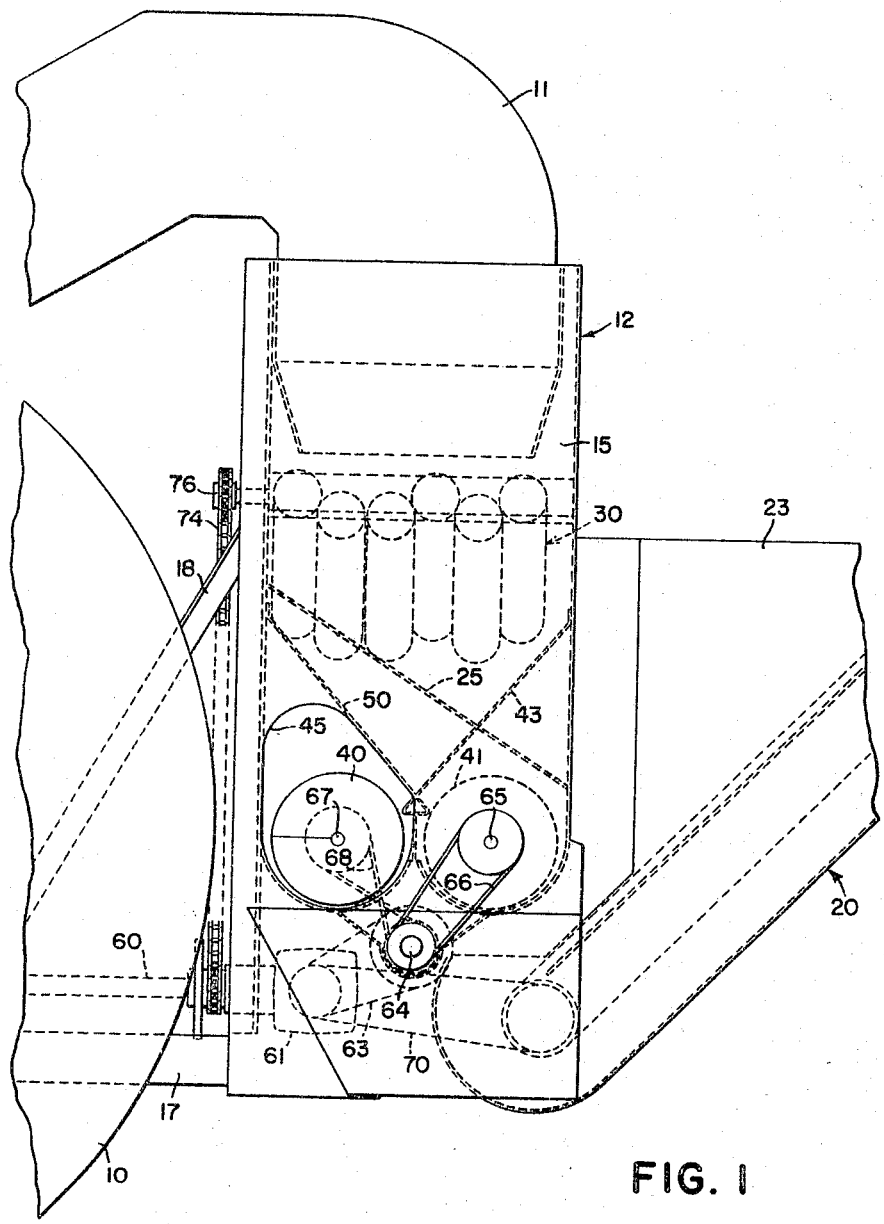
FIG. 1 is a side view of the crop treating unit and a portion of the tractor and harvesting units associated therewith.

The corn treating unit is supported on one end of a mobile vehicle or tractor, indicated by its rear traction wheel 10 in FIG. 1. The corn treating unit operates in conjunction with a pair of corn harvesting units, not shown, but having rear elevators, one of which is shown at 11, transversely spaced apart and terminating at rear ends that direct the harvested crop or ears of corn downwardly. A housing 12 has a pair of upwardly opening inlets at opposite ends that receives the ears of corn from the elevators 11. The housing 12 is composed of front and rear upright and transverse walls 13, 14 closed at opposite ends by upright end wall structures 15, 16. The housing 12 is supported on the tractor by horizontal support beams 17 and inclined braces 18 that extend from the forward wall 13 to structural members on the tractor. A pair of upright angle iron members 19 is fixed to the forward wall 13 and receives the upper rear ends of the braces 18.

A discharge elevator 20 has its lower end integrally connected to the housing structure 12 and includes a flight-type conveyor 21 contained within an elevator housing 22. The elevator housing 22 has an upwardly and forwardly opening hopper structure composed of a left-hand upright wall 23 and a transversely spaced right-hand upright wall 24 extending from the housing 22 forwardly into and through the housing structure 12. The walls 23, 24 are connected at their forward edges to the front transverse wall 13. The two walls 23, 24 together with the outer wall structures 15, 16 compartmentize the entire housing structure into a left-hand outer compartment formed between the walls 15 and 23, a right-hand outer compartment formed between the wall 24 and the outer wall 16, and a central compartment substantially on the fore-and-aft center line of the entire mechanism, formed between the walls 23, 24. The walls 23, 24 are interconnected by an inclined floor panel 25 forming the floor of the hopper or central compartment. The panel 25 extends from an upper end adjacent to and fixed to the wall 13 to a rear lower end that forms the forward limit of an upwardly opening material inlet 26 that feeds directly onto the upper flight of the conveyor 21. The upper flight of the conveyor 21 has beneath it a transverse horizontal panel 27. The inlet 26 is completely rearwardly of the rear transverse wall 14 of the housing structure 12.

Retained within the housing 12 in the left- and right-hand outer compartments are crop treating units in the form of husking beds 30, 31 respectively. The husking beds 30, 31 are composed of conventional type husking rolls 32 that extend transversely within the housing. The rolls 32 of the left husking bed 30 are supported in an inclined disposition from upper outer ends fixed to a gear transmission box 33 and extend downwardly to lower ends supported in a series of journals contained in a journal plate 34 fixed to the outer face of the plate or panel 23. The rolls 32 of right-hand husking bed 31 extend from outer upright ends adjacent the end wall 16 and are supported on a gear box 36 extending between the front and rear walls 13, 14. The rolls 32 extend downwardly from their upper ends to lower inner ends suitably journaled in a journal plate 37. Viewing FIGS. 3 and 4, the upper edges of the respective plates 23, 24 are disposed slightly below the inner lower ends of the respective husking beds 30, 31. Consequently the treated or husked ears pass over the respective upper edges of plates 23, 24 and into the central compartment formed between the plates 23, 24. As may be seen from viewing FIG. 2, the outer ends of the respective husking beds 30, 31 are positioned under the material inlets of the housing 12.

Positioned beneath the husking beds 30, 31 are first and second transverse auger conveyors 40, 41 extending the transverse width of the housing structure 12. As may be seen from viewing FIGS. 3–5, the front or first auger 40 has its auger trough 42 opening upwardly beneath the husking bed 31 for receiving the trash or husks passing through the respective rolls 32. An inclined panel 43 is provided in the outer compartment or beneath the husking bed 31 and extends from the rear wall 14 downwardly in overlying relation to the second transverse auger 41. The panel 43 is connected to an upright extension 44 of the rear side of auger trough 42. The auger 40 moves the trash from the right-hand side of the housing 12 under the panel 25 of the elevator hopper to the outer or left-hand end of the housing 12. The left end wall structure 15 is provided with an opening 45 that permits the trash to be discharged out the end of the housing 12. The auger 41 opens upwardly in the left-hand outer compartment for purposes of receiving the trash passing through the husking bed 30. Semi-circular downward openings 46, 47 and 48, 49 are provided in the panels 23, 24 to accommodate the upper halves of the augers 40, 41. A panel 50 is inclined downwardly from the front wall 13 and in overlying relation to the auger 40 and is connected at its lower edge to the vertical extension 44 extending upwardly from the auger trough 51 of the auger 41. The auger 41 therefore receives the trash from the husking bed 30 and moves it from the left-hand end of the housing 12 under the panel 25, the floor panel 43 in the right compartment, and from there outwardly through a discharge opening 53 in the right-hand end wall 16.

The auger troughs 42, 51 have perforations 55, 56 in the floor that passes incidental kernels of corn moving with the trash by the augers 40, 41 into a lower transverse auger 57. The flighting of the conveyor 57 is in opposite directions on opposite sides of the fore-and-aft center line of the unit and the auger 57 operates to feed material centrally inwardly to the lower or boot end of the elevator 20. Inclined panels 58, 59 extends from the trough of the auger 57 to the respective troughs 42, 51 of the transverse conveyors 40, 41 and operate to guide the kernels passing through the openings 55, 56 into the auger conveyor 57.

Power for operating the entire husking unit is received from the power take-off shaft, not shown, on the tractor which transmits power to a rear shaft extension 60 extending into a gear transmission 61. A transverse power shaft 62 extends outwardly to the right-hand end of the housing 12. The small grain auger 57 is drivingly connected at the right-hand end of the housing by means of a chain drive 63 to the shaft 62. A shaft 64 extends the full length of the small grain auger 57 and has opposite ends extending outwardly beyond the respective outer walls 15, 16. The center shaft 65 of the rear or second auger 41 is driven by the left end of the shaft 64 by means of a belt drive 66. The auger shaft 67 of the first or forward auger conveyor 40 is driven from its right end by means of a belt drive 68 that receives its power from the right end of the shaft 64. The chain and sprocket drive 70, indicated only in dotted representation, extends from a short drive shaft 71 extending from the gear box 61. The chain drive 70 drives the elevator drive shaft 72 on which is carried the flight-type conveyor 21 of the elevator. Fixed to the shaft 60 forward of the gear box 61 is a pair of sprockets that carry chains 74, 75 extending outwardly and upwardly to the main drive shafts 76, 77 connected to the respective gear boxes 33, 36.

There has thus been described an apparatus for treating corn which comprises an upright transverse housing structure 12 having transversely spaced left- and right-hand ends as indicated by the end walls 15, 16, on opposite sides of the fore-and-aft center line of the housing 12. Within the housing 12 is a pair of transverse corn treating devices or husking mechanisms 30, 31 that extend from outer material receiving ends adjacent to and in material receiving relation to the material inlets at the outer ends of the housing. The husking beds extend from the outer ends downwardly and inwardly to a central section of the housing structure where the treated corn will be discharged by gravity. The apparatus further includes a pair of parallel transverse conveyors 40, 41 with the first conveyor 41 adapted to move the material from the left-hand end of the housing 12 to the right-hand end of the housing 12. The second conveyor moves material from the right-hand end of the conveyor to the left-hand end of the housing. The first conveyor opens upwardly to receive material from the left husking bed 30 while a panel 50 blocks movement of the trash from entering the forward or second auger 40. On the right side of the housing structure, the auger 40 receives material moving downwardly from the husking bed 31 and a panel 43 blocks material from moving into the first or rear conveyor 41. The upwardly opening U-troughs 42, 51 are perforated to permit incidental kernels of corn dislodged in the treating or husking operation to pass out of the respective troughs 42, 51 into a lower transverse conveyor 57 that moves the kenels of corn inwardly into a centerally located fore-and-aft extending elevator 20. The augers 40, 41 pass beneath a floor panel 25 that is centrally located and is disposed between the inner ends of the husking beds 30, 31. The panel 25 together with a pair of upright panels closely adjacent the lower inner ends of the husking beds 30, 31 form part of a large hopper that feeds material over the transverse augers 40, 41 into an upper side of the elevator 20. Thus, it may be seen that applicant has provided a means for collecting the husks at one end of the housing structure and to move the husks the entire transverse width of the housing so that there will be ample opportunity or time for the incidental kernels of corn to pass through perforations 55, 56 and into a collecting conveyor 57.

While only one form of the invention has been shown, it should be recognized that other forms and variations will occur to those skilled in the art without departing from the nature of the invention. Therefore, while the preferred form was shown in concise and detailed manner for the purpose of fully explaining the principles of the invention, there is no intention to limit or narrow the invention beyond the broad concept set forth in the appended claims.

What is claimed is:

1. A corn treating mechanism adapted for support on a mobile vehicle comprising: an upright transverse housing structure supported on one end of the vehicle and having transversely spaced left- and right-hand ends on opposite sides of the fore-and-aft center line of the vehicle and a pair of material inlets adjacent the ends; a pair of transverse corn treating devices on the left- and right-hand sides respectively of the fore-and-aft center line supported in the housing structure and extending from outer material receiving ends adjacent to and in material receiving relation to the inlets to inner ends in spaced relation to one another whereby corn may gravitate between the inner ends, the devices being adapted to move material from their outer to their inner ends; first and second material transverse conveyors supported within the housing structure beneath the treating devices, each conveyor extending between the left- and right-hand ends of the housing structure with the first of the conveyors adapted to move material from the left-hand end to and for discharge at the right-hand end and the second of the conveyors adapted to move material from the right-hand end to and for discharge at the left-hand end; first panel means beneath the left-hand treating unit for guiding material passing downwardly therefrom to the first of the conveyors and for blocking the material from passing into the second of the conveyors; second panel means beneath the right-hand treating unit for guiding material passing downwardly therefrom to the second of the conveyors and for blocking the material from passing into the first of the conveyors; and a discharge elevator extending from the housing structure and having a boot end adapted to receive materials gravitating from the inner ends of the treating units.

2. The invention as set forth in claim 1 in which the corn treating units are inclined downwardly from their outer to their inner ends.

3. The invention as set forth in claim 1 in which the first and second panel means include first and second panels underlying the respective treating units with the first panel overlying the second conveyor and being inclined downwardly from an upper edge adjacent the left-hand treating unit to a lower edge between the first and second conveyors, and with the second panel overlying the first conveyor and being inclined downwardly from an upper edge adjacent the right-hand treating unit to a lower edge between the first and second conveyors.

4. The invention as set for in claim 3 in which the conveyors include transveresly extending U-troughs with vertically extending sides therebetween and the respective lower edges of the first and second panels are connected to the sides.

5. The invention as set forth in claim 1 further characterized by a central panel means disposed beneath and between the inner ends of the crop treating units and overlying both the first and second transverse conveyors, the latter panel means being inclined and adapted to receive and guide materials gravitating from the inner ends to the elevator.

6. The invention as set for in claim 5 further characterized by a material receiving opening behind the housing structure and the central panel means being disposed to guide materials into the opening.

7. The invention as set for in claim 1 further characterized by the conveyors being composed of U-troughs having material conveying means therein and the floors of the U-troughs are grilled to permit passage of incidental kernels of corn; and a pair of transverse conveyors conveyors beneath the U-troughs adapted to receive the kernels and move them inwardly for deposit in the lower end of the elevator.

8. A corn treating mechanism adapted for support on a mobile vehicle comprising: an upright transverse housing structure supported on one end of the vehicle and having transversely spaced left- and right-hand ends on opposite sides of the fore-and-aft center line of the vehicle and a pair of upper material inlets adjacent the ends; a pair of husking beds positioned on the left- and right-hand sides of the fore-and-aft center line supported in the housing structure and inclined downwardly from upper and outer material receiving ends adjacent to and in material receiving relation to the inlets to lower inner material discharge ends adjacent to but in spaced relation to one another and offset to opposite sides of the fore-and-aft center line to one another whereby corn may gravitate between the inner ends; first and second material transverse conveyors supported within the housing structure beneath the husking beds, each conveyor extending between the left- and right-hand ends of the housing structure with the first of the conveyors adapted to move material from the left-hand end to the right-hand end and the second of the conveyors adpated to move material from the right-hand end to the left-hand end; upwardly opening first and second conveyor trough means for the respective first and second conveyors and having grilled floor means for passing incidental kernels of corn; first panel means beneath the left-hand husking bed for guiding material passing downwardly therefrom to the first of the conveyors and for blocking the material from passing into the second of the conveyors; second panel means beneath the right-hand husking bed for guiding material passing downwardly therefrom to the second of the conveyors and for blocking the material from passing into the first of the conveyors; a discharge elevator having a boot end in material receiving relation to the materials gravitating from the inner ends of the husking beds; and conveyor means beneath the conveyor troughs for collecting and delivering the kernels of corn passing through the trough means to the boot end of the elevator.

9. A corn treating mechanism adapted for support on a mobile vehicle comprising: an upright transverse housing structure supported on one of the vehicle and having transversely spaced left- and right-hand ends on opposite sides of the fore-and-aft center line of the vehicle, a pair of upper material inlets adjacent the ends, and front and rear upright walls interjoined by fore-and-aft upright walls spaced from the respective ends to compartmentize the housing structure into a central compartment and left and right end compartments on opposite sides of the fore-and-aft center line; a pair of corn treating units supported in the housing structure above the respective end compartments and extending from outer material receiving ends adjacent to and in material receiving relation to the inlets to inner material discharge ends adjacent and central compartment whereby the treated corn may gravitate into the central compartments, the treating units being adapted to discharge trash downwardly into the end compartments and to move the treated corn to the central compartment; first and second material transverse conveyors supported within the housing beneath the corn treating units, each conveyor extending between the left- and right-hand ends of the housing structure with the first of the conveyors opening into the left end compartment and adapted to move material therefrom to the right-hand end of the housing structure and the second of the conveyors opening into the right end compartment and adapted to move material therefrom to the left-hand end of the housing structure; first and second conveyor trough means for the respective first and second conveyors and having grilled floor means for passing incidental kernels of corn; a discharge elevator having an end in material receiving relation to the central compartment; and conveyor means beneath the conveyor troughs for collecting and delivering the kernels of corn passing through the trough means to the end of the elevator.

10. A corn treating mechanism comprising: an upright transverse housing structure having a pair of transversely spaced upper material inlets, and front and rear upright walls interjoined by fore-and-aft upright walls compartmentizing the housing structure into a central compartment and left and right end compartments; a pair of corn treating units supported in the housing structure above the respective and compartments and extending from outer material receiving ends adjacent to and in material receiving relation to the inlets to inner material discharge ends adjacent the central compartment whereby the treated corn may gravitate into the central compartment, the treating units being adapted to discharge trash downwardly into the end compartments and to move the treated corn to the central compartment; first and second material transverse conveyors supported within the housing beneath the corn treating units, with the first of the conveyors opening into the left end compartment and adapted to move material therefrom beneath the central and right end compartments to the right-hand end of the housing structure and the second of the conveyors opening into the right end compartment and adapted to move material therefrom beneath the central and left end compartments to the left-hand end of the housing structure; first and second conveyor trough means for the respective first and second conveyors and having grilled floor means for passing incidental kernels of corn; a discharge elevator having an end in material receiving relation to the central compartment; and conveyor means beneath the conveyor troughs for collecting and delivering the kernels of corn passing through the trough means to the end of the elevator.

11. A corn treating mechanism comprising: an upright transverse housing structure having a pair of transversely spaced upper material inlets, and front and rear upright walls interjoined by fore-and-aft upright walls compartmentizing the housing structure into a central compartment and left and right end compartments; a pair of corn treating units supported in the housing structure above the respective end compartments and extending from outer material receiving ends adjacent to and in material receiving relation to the inlets to inner material discharge ends adjacent the central compartment whereby the treated corn may gravitate into the central compartment, the treating units being adapted to discharge trash downwardly into the end compartments and to move the treated corn to the central compartment; first and second material transverse conveyors supported within the housing beneath the corn treating units, with the first of the conveyors opening into the left end comparment and adapted to move material therefrom beneath the central and right end compartments to the right-hand end of the housing structure and the second of the conveyors opening into the right end compartment and adapted to move material therefrom beneath the central and left end compartments to the left-hand end of the housing structure; a discharge elevator having an end in material receiving relation to the central compartment.

12. The invention as set forth in claim 11 further characterized by the central compartment having a base panel disposed over both conveyors and inclined to discharge material at the rear of the housing structure and the elevator opens upwardly to receive the material.

References Cited
UNITED STATES PATENTS 2,420,543  5/1947  Johnson et al.
3,074,412  1/1963  Slavens.

ABRAHAM G. STONE, *Primary Examiner.*

ANTONIO F. GUIDA, *Examiner.*

UNITED STATES PATENT OFFICE
CERTIFICATE OF CORRECTION

Patent No. 3,324,859                                          June 13, 1967

Fredrick R. Bossard

It is hereby certified that error appears in the above numbered patent requiring correction and that the said Letters Patent should read as corrected below.

Column 6, lines 3, 15 and 19, for "for", each occurrence, read -- forth --; line 24, strike out "conveyors"; line 67, for "one" read -- one end --; column 7, line 3, for "and" read -- the --; line 32, for "and", first occurrence, read -- end --; column 8, line 26, for "comparment" read -- compartment --; line 32, for "structure;" read -- structure; and --.

Signed and sealed this 18th day of June 1968.

(SEAL)
Attest:

Edward M. Fletcher, Jr.                               EDWARD J. BRENNER
Attesting Officer                                          Commissioner of Patents